(12) United States Patent
Lock et al.

(10) Patent No.: US 10,450,398 B2
(45) Date of Patent: Oct. 22, 2019

(54) HIGH FUNCTIONALITY POLYESTERS AND COATINGS COMPRISING THE SAME

(71) Applicant: PPG Industries Ohio, Inc., Cleveland, OH (US)

(72) Inventors: Kam Lun Lock, Orpington (GB); Richard Woods, Saffron Walden (GB); Nigel Francis Masters, Romford (GB)

(73) Assignee: PPG Industries Ohio, Inc., Cleveland, OH (US)

(*) Notice: Subject to any disclaimer, the term of this patent is extended or adjusted under 35 U.S.C. 154(b) by 202 days.

(21) Appl. No.: 15/611,114

(22) Filed: Jun. 1, 2017

(65) Prior Publication Data
US 2017/0267802 A1    Sep. 21, 2017

Related U.S. Application Data

(63) Continuation of application No. 12/752,551, filed on Apr. 1, 2010, now Pat. No. 9,695,264.

(51) Int. Cl.
*C08F 299/04* (2006.01)

(52) U.S. Cl.
CPC ...... *C08F 299/045* (2013.01); *C08L 2205/02* (2013.01); *Y10T 428/1355* (2015.01); *Y10T 428/31681* (2015.04)

(58) Field of Classification Search
CPC ... C08G 63/181; C08F 299/04; C09D 167/02; C09D 167/06; Y10T 428/31507; Y10T 428/31681; Y10T 428/31876
See application file for complete search history.

(56) References Cited

U.S. PATENT DOCUMENTS 6,214,898 B1 * 4/2001 Diloy Barrio ........ C08F 283/01
522/24

* cited by examiner

*Primary Examiner* — Robert S Jones
(74) *Attorney, Agent, or Firm* — Diane R. Meyers, Esq.

(57) ABSTRACT

A polyester prepared by free radical polymerization of an unsaturated polyester prepolymer, wherein the polymerization occurs primarily by reaction of the unsaturation of said prepolymer is disclosed. Coatings comprising the same are also disclosed, as are substrates coated at least in part with such coating.

10 Claims, No Drawings

HIGH FUNCTIONALITY POLYESTERS AND COATINGS COMPRISING THE SAME

CROSS-REFERENCE TO RELATED APPLICATION

This application is a continuation of application Ser. No. 12/752,551, filed Apr. 1, 2010.

FIELD OF THE INVENTION

The present invention relates to crosslinkable polyesters prepared by free radical polymerization of the double bonds of an unsaturated polyester prepolymer.

BACKGROUND OF THE INVENTION

Conventional linear and branched polyester resins produced by the polycondensation of different combinations of polyols and polyacids have been widely used in the coatings industry. They have been used to coat a wide range of metallic and non-metallic substrates used in a number of different industries. These industries particularly include those in which flexible coatings are desired. Particularly suitable examples include substrates used in the packaging industry, coil coatings, and certain industrial and automotive coatings. Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beers and beverages, and may also need to withstand retort conditions commonly employed in food packaging. In the coil coating industry, the coil is unrolled, coated and re-rolled. The coating used must therefore have sufficient flexibility to withstand both the rolling process as well as the subsequent stamping or other formation processes during which the coil is fabricated into the desired piece or end product; the durability of the paint on the end piece or product is also a factor. Similarly, it is often desired that coatings used in the automotive industry exhibit both flexibility and durability.

High molecular weight polyesters, which typically have good flexibility and resistance to mechanical deformation, can be made by controlling the ratio of polyol:polyacid and the extent of reaction. Such polymers, however, generally have a relatively low average functionality per chain, which limits their further use in coatings. Increasing the functionality, on the other hand, may result in a polyester having a lower molecular weight. Use of low molecular weight polyester resins in coatings can result in poor substrate adhesion, limited compatibility with other types of resins, and/or difficulty in achieving the required balance of chemical resistance and flexibility.

Polyesters having a high level of functionality without sacrificing molecular weight are therefore desired.

SUMMARY OF THE INVENTION

The present invention is directed to a crosslinkable polyester prepared by free radical polymerization of the double bonds of an unsaturated polyester prepolymer. The number average functionality of the unsaturation in the prepolymer is 0.05 to 25. The present invention is further directed to coatings comprising such a polyester and a crosslinker therefor.

The present invention is directed to a polyester prepared by free radical polymerization of an unsaturated polyester prepolymer. The polyester is crosslinkable. As used herein, "crosslinkable" and like terms means that the polyester can undergo crosslinking with another compound. That is, the polyester has functionality that will react with functionality on another compound, such as a crosslinker. The present polyesters are thermoset materials, and not thermoplasts.

The polyester is formed by using free radical polymerization, wherein the unsaturation of the prepolymer reacts to form the polyester. Thus, the prepolymer is unsaturated, and the unsaturation is reacted to the desired level or degree during formation of the polyester. In certain embodiments, the reaction is run such that substantially all of the unsaturation is reacted in the formation of the polyester, while in other embodiments the resulting polyester also comprises some degree of unsaturation. For example, the resulting polyester can comprise enough unsaturation to render the polyester reactive with other functional groups. The prepolymer also comprises functional groups in addition to the unsaturation. This functionality remains largely unreacted during the free radical polymerization. As such, the resulting polyester has functionality that renders it crosslinkable. Such functionality can be pendant and/or terminal, depending on the prepolymer or prepolymers used.

The unsaturated polyester prepolymer can be prepared by any means known in the art, such as polycondensation, by reacting a polyacid and/or an ester and/or anhydride thereof with a polyol. "Polyol" and like terms, as used herein, refer to a compound having two or more hydroxy groups. "Polyacid" and like terms, as used herein, refer to a compound having two or more acid groups and include the ester and/or anhydride of the acid. The polyacid and/or the polyol is unsaturated. The polyacid and/or the polyol may also contain one or more additional functional groups, as discussed above. Such additional functional groups can include, for example, hydroxyl, carboxyl, amino, epoxy and/or silane groups. Such functionality is referred to as "additional" functionality or functional group, because it will be understood by those skilled in the art that the unsaturation of the polyacid and/or the polyol provides functionality. The additional functional group can be on the polyacid and/or polyol and can be on the same or different polyacid and/or polyol that contains the unsaturation. The additional functionality is chosen such that when the polyol and polyacid react, the result is a prepolymer that has a terminal and/or pendant functional group. "Terminal functional group", "terminal functionality" and like terms refer to a functional group, such as any of those listed above, at chain ends of the prepolymer or resulting polyester. "Pendant functional groups", "pendant functionality" and like terms refer to a functional group, such as any of those listed above, which are not found at chain ends of the prepolymer or resulting polyester. It is also possible, however, that an additional functional group that results in functionality on the prepolymer is introduced by another monomer, as described below.

Suitable unsaturated polyacids for use in the invention may be any unsaturated carboxylic acid containing two or more carboxy groups and/or an ester and/or anhydride thereof. Examples include but are not limited to maleic acid, fumaric acid, itaconic acid, citraconic acid, mesaconic acid, teraconic acid, and/or esters and/or anhydrides thereof. Where the polyacid is in the form of an ester, these esters may be formed with any suitable alcohol, such as $C_1$-$C_{18}$ alkyl esters formed by reaction of a $C_1$-$C_{18}$ alcohol (e.g. methanol, ethanol, 1-propanol, 1-butanol, 2-butanol, isobutanol, 1-pantanol, 1-pentanol and 1-hexanol) with the polyacid. A particularly suitable unsaturated polyacid is maleic acid, maleic anhydride or a $C_1$-$C_6$ alkyl ester of maleic acid. Suitable saturated polyacids for use in the present invention include but are not limited to 1,3-cyclohexane dicarboxylic acid, 1,4-cyclohexane dicarboxylic acid, adipic acid, azelaic acid, sebacic acid, succinic acid, glutaric acid, decanoic diacid, dodecanoic diacid and esters and anhydrides thereof. Combinations of unsaturated and/or saturated polyacids can be used. As will be appreciated, in certain embodiments the polyacid is aliphatic. In certain embodiments, the polyacid comprises maleic, fumaric and/or itaconic acid, and/or the ester(s) and/or anhydrides(s) thereof, and in other embodiments the polyacid comprises maleic, fumaric and/or itaconic acid, and/or the ester(s) and/or anhydrides(s) thereof and is substantially, or completely, free of any other monomer. In certain embodiments the unsaturated carboxylic acid/anhydride/ester comprises 3 to 10 weight % of the polyester, such as 4 to 7 weight %, while in other embodiments it comprises greater than 10 weight %, such as 15 weight % or more of the polyester.

Suitable saturated polyols for use in the invention may be any polyols known to be used for making polyesters. Examples include but are not limited to alkylene glycols, such as ethylene glycol, propylene glycol, diethylene glycol, dipropylene glycol, triethylene glycol, tripropylene glycol, hexylene glycol, polyethylene glycol, polypropylene glycol and neopentyl glycol; hydrogenated bisphenol A; cyclohexanediol; propanediols including 1,2-propanediol, 1,3-propanediol, butyl ethyl propanediol, 2-methyl-1,3-propanediol, 2,2-dimethyl-1,3-propanediol, 2-ethyl-2-butyl-1,3-propanediol, butanediols including 1,4-butanediol, 1,3-butanediol, and 2-ethyl-1,4-butanediol, pentanediols including trimethyl pentanediol and 2-methylpentanediol; cyclohexanedimethanol; tricyclodecanedimethanol; hexanediols including 1,6-hexanediol; caprolactonediol (for example, the reaction product of epsilon-caprolactone and ethylene glycol); hydroxy-alkylated bisphenols; polyether glycols, for example, poly(oxytetramethylene) glycol; trimethylol propane, pentraerythritol, di-pentaerythritol, trimethylol ethane, trimethylol butane, dimethylol cyclohexane, glycerol, erythritol and the like. Suitable unsaturated polyols for use in the invention may be any unsaturated alcohols containing two or more hydroxyl groups. Examples include but are not limited to trimethylol propane monoallyl ether, trimethylol ethane monoallyl ether and prop-1-ene-1,3-diol. Combinations of unsaturated and/or saturated polyols can be used.

The unsaturated polyester prepolymer of the invention may further include one or more optional additional monomers such as an aromatic polyacid, a monofunctional acid, a fatty acid, the ester or anhydrides of any of these acids, an aromatic polyol and/or a monofunctional alcohol. In certain embodiments, the "additional" functional group can be introduced to the unsaturated polyester prepolymer by way of these one or more optional additional monomers. That is, the additional functional group can be on the polyacid and/or polyol, as described above, and/or can be on the one or more optional additional monomers. Thus, the "additional" functionality can be introduced in a variety of ways.

Non-limiting examples of suitable additional monomers include acids, and esters and anhydrides thereof, such as phthalic acid, isophthalic acid, 5-tert-butyl isophthalic acid, tetrachlorophthalic acid, tetrahydrophthalic acid, naphthalene dicarboxylic acid, terephthalic acid, hexahydrophthalic acid, methylhexahydrophthalic acid, dimethyl terephthalate, trimellitic acid, and cycloaliphatic carboxylic acids including cyclohexanedicarboxylic acids, endomethylene tetrahydrophthalic acid, tricyclodecane dicarboxylic acid, endoethylene hexahydrophthalic acid, camphoric acid, cyclohexanetetra carboxylic acid and cyclobutane tetracarboxylic acid, $C_1$-$C_{18}$ aliphatic carboxylic acids such as acetic acid, propanoic acid, butanoic acid, hexanoic acid, oleic acid, linoleic acid, undecanoic acid, lauric acid, isononanoic acid, other fatty acids, and hydrogenated fatty acids of naturally occurring oils, benzoic acid, t-butyl benzoic acid, and esters and anhydrides thereof.

Non-limiting examples of suitable additional poly- and monofunctional alcohols include hydroxy-alkylated bisphenols and aromatic alcohols, such as benzyl alcohol and hydroxymethoxybenzene, $C_1$-$C_{18}$ aliphatic alcohols, such as methanol, ethanol, propanol, hexanol, stearyl alcohol, oleyl alcohol and undecanol, and aromatic alcohols, such as benzyl alcohol and hydroxyethoxybenzene.

The unsaturated polyester prepolymer can be made in any manner known in the art, and may vary depending on the components used to make the prepolymer. For example, in one embodiment of the present invention, a polyacid and polyol, at least one of which is unsaturated, are reacted to prepare an unsaturated polyester prepolymer. This reaction product can then be further reacted with other optional monomers, such as any of those described above; the resulting product will also be an unsaturated polyester prepolymer suitable for use according to the present invention. An example of an unsaturated polyester prepolymer prepared in this manner includes a polymer in which a diol and maleic anhydride (or fumaric acid) are reacted to produce a maleate (or fumarate) linear polymer in the first stage. This is then reacted with polyol (such as glycerine or trimethylol propane) and an aliphatic (or cycloaliphatic) poly acid to produce a branched unsaturated polyester precursor or prepolymer. A linear unsaturated prepolymer could also be produced in a similar manner by using a diacid. In another embodiment of the present invention, a polyol and polyacid, both of which are saturated, can be reacted, and the reaction product further reacted with an unsaturated monomer. A particularly suitable unsaturated polyester prepolymer made in this manner is one in which a diol is reacted with isophthalic acid, which results in a reaction product having a relatively low acid value, and a relatively high hydroxy value. This reaction product can then be further reacted with maleic acid, ester, or anhydride to introduce unsaturation into the resulting low acid value prepolymer.

Regardless of the manner in which the unsaturated polyester prepolymer is made, the order of addition of monomers comprised in the prepolymer, and the like, the result should be an unsaturated polyester prepolymer. The number average functionality ("Fn") of unsaturation in the prepolymer is 0.05 to 25.0. In certain embodiments, the Fn is 0.1 or greater, such as 0.2 or greater, 0.5 or greater, 0.8 or greater, 1.0 or greater, or 1.2 or greater, with an upper limit of 2.0, 2.5, 5.0, 7.0, 9.0, 10 or even higher. Any values within the range 0.05 to 25.0 are within the scope of the present invention. In certain embodiments, the unsaturation will derive from maleic acid/anhydride and the prepolymer will have an average of 0.2 or greater maleic residues, such as 0.5 or greater, 0.9 or greater or even higher, such as 2.0 or greater.

It will be further appreciated that the unsaturated polyester prepolymer can have a varying degree of unsaturation within the general Fn range of 0.05 to 25.0, and that following the polycondensation reaction or other reaction in which the unsaturated polyester prepolymer is formed there will be a distribution of polymer species with varying degrees of unsaturation, varying chain lengths, varying degrees of branching and varying numbers and/or types of terminal groups. The average number of double bonds per unsaturated polyester prepolymer chain can be varied depending upon the degree of free radical polymerization that is desired to provide the target polyester and the varying properties that will result from the resulting polyester. Accordingly, the number of double bonds per unsaturated polyester prepolymer chain is typically reported as the average (Fn). Unsaturation in the polyester prepolymer can be derived, for example, from the residue of a maleic acid, ester or anhydride. In certain embodiments, the unsaturated moiety is substantially incorporated in the chain at a location other than the end or terminus of the prepolymer. "Substantially incorporated" in this context means that only trace reaction at the terminus occurs. In other embodiments, there is no incorporation of the unsaturation at the terminus.

The polycondensation reaction to form the unsaturated polyester prepolymer can be performed in the presence of an esterification catalyst. Any polycondensation catalyst typically used in the preparation of polyesters may be used. Suitable non-limiting examples of the esterification catalyst include tin, titanium and zinc catalysts such as dibutyl tin oxide (DBTO), stannous chloride, stannous oxalate, stannous octoate, butyl stannoic acid, tetra-n-butyl titanate, tetra isopropyl titanate, zinc acetate and zinc stearate. In certain embodiments, it may also be desired to include a polymerization inhibitor that functions to inhibit polymerization at the points of unsaturation; reaction at the points of unsaturation might result in a saturated or largely saturated prepolymer. Suitable examples of such an inhibitor include, but are not limited to, methylhydroquinone, and t-butyl hydroquinone.

As noted above, the prepolymer of the present invention will also comprise terminal and/or pendant functionality. In certain embodiments, terminal functionality will occur at substantially all termini, including branched chain ends. If the terminal and/or pendant functionality comprises a hydroxy group, then the hydroxy value of the unsaturated polyester prepolymer can be from 2 to 500 mg KOH/gm, such as from 0 to 350, 30 to 250, 40 to 200, 50 to 200 mg KOH/gm and the like; if the terminal and/or pendant functionality comprises an acid group, then the acid value of the unsaturated polyester prepolymer can be from 1 to 400 mg KOH/gm, such as 10 to 500, 20 to 200, 30 to 250, 30 to 150, 40 to 100 mg KOH/gm and the like. Any values between these broad ranges are also within the scope of the present invention.

The unsaturated polyester prepolymer can have a number average molecular weight ("Mn") of from 150 to 5,000 such as 250 to 2,500, and a weight average molecular weight ("Mw") of from 250 to 50,000, such as 1,000 to 20,000. Any values between these broad ranges are also within the scope of the present invention.

The polyester of the present invention is primarily formed by free radical polymerization of the unsaturated polyester prepolymer chains by reaction at the points of unsaturation. As in the formation of the prepolymer, in the formation of the polyester a variety of reaction products can be formed. While the majority of these reaction products will be formed via reaction of the unsaturation, there is also likely to be at least some reaction between the unsaturation and the additional functionality of the prepolymer. Accordingly, in certain embodiments, the polydispersity or polydispersity index ("PDI") of the polyester polymer will be 1 or greater, such as 2.0, 10, 50, 200 or greater, or such as between 4 and 40.

The polymerization is conducted in the presence of a free radical initiator. Any free radical initiator typically used to initiate the polymerization of unsaturated compounds containing double bonds may be used in the free radical polymerization. For example, the free radical initiator can be an azo initiator or a peroxide initiator, such as tert-butyl peroxy-2-ethylhexanoate, tert-butyl peroxybenzoate, tert-butyl peroxy-3,5,5-trimethylhexanoate or dibenzoyl peroxide. The ratio of initiator to unsaturated polyester prepolymer may be varied depending upon the degree of linkage of the chains of the polyester prepolymer that is desired. For example, the molar ratio of the initiator to the average number of double bonds per chain of the unsaturated polyester prepolymer may be 0.0001 to 1.0, such as 0.001 to 0.7, 0.01 to 0.5, 0.05 to 0.2 and the like.

Depending upon the degree of control of the polymerization that is desired, the initiator can be added in different portions at different times. For example, all of the free radical initiator may be added at the start of the reaction, the initiator may be divided into portions and the portions added at intervals during the reaction, or the initiator may be added as a continuous feed. In some embodiments of the invention, the process may be carried out by using a combination of continuous feed and initiator added in portions. It will be appreciated that the addition of initiator at set intervals or in a continuous feed will result in a more controlled process than adding all of the initiator at the start. Moreover, if all of the initiator is added at once, the heat produced due to the exothermic reaction may make it difficult to control the temperature.

The temperature at which the free radical polymerization reaction is conducted may be varied depending on factors such as the composition of the unsaturated polyester prepolymer, the initiator, the solvent and the properties that are desired in the polyester. Typically, the free radical polymerization of the unsaturated polyester prepolymer is conducted at a temperature of from 30° C. to 180° C. or higher, for example, 50° C. to 150° C. or 80° C. to 130° C. In a typical polymerization, such as an acrylic polymerization, a higher concentration of free radical initiator results in more chains being polymerized, each with a relatively low molecular weight. It has been surprisingly discovered in the present system, particularly when maleic is used, the higher the initiator concentration, the higher the molecular weight of the resulting polymer. This is a surprising result as those skilled in the art would not have expected the present polymerization to occur. Too much initiator, however, can lead to gellation. In certain embodiments, therefore, the polyester of the present invention is ungelled.

While any means can be used to polymerize the polyester, for ease of handling, the free radical polymerization can be performed using solutions of the unsaturated polyester prepolymer. Any solvent may be used, as long as it is able to dissolve the unsaturated polyester prepolymer and the free radical initiator to a sufficient degree to allow the polymerization to take place efficiently. Typical examples of suitable solvents include butyl glycol, propylene glycol mono methyl ether, methoxy propyl acetate and xylene. The unsaturated polyester prepolymer can also be formed under fusion (that is, of 100% solids), the resulting unsaturated polyester prepolymer cooled, a suitable solvent and free radical initiator then added followed by free radical polymerization, enabling the formation of the polyester of the present invention, having the desired molecular weight and functionality, to be performed in a continuous process. Thus, the polyester of the present invention can be solid or liquid.

The free radical polymerization of the unsaturated polyester can also be carried out in water or other aqueous media, i.e. in mixtures containing water. If the unsaturated polyester prepolymer has sufficient carboxylic acid groups, it may be converted into a water-diluted material by neutralization, or partial neutralization, with a suitable base, followed by addition of the water. Non-limiting examples of suitable bases for the neutralization include dimethylethanolamine, triethylamine and 2-amino-2-methyl propanol. This aqueous material can then be polymerized with free radicals as described above. Alternatively, the unsaturated polyester prepolymer may be mixed with surfactant and/or polymeric stabilizer material followed by mixing with water prior to free radical radical polymerization as described previously. It will also be apparent, to those skilled in the art, that these aqueous mixtures may contain additional organic cosolvents, examples of which include, but are not limited to, butyl glycol, butyl diglycol and propylene glycol monomethyl ether.

As noted above, the polyesters of the present invention are formed by free radical polymerization via the double bonds of an unsaturated polyester prepolymer. In certain embodiments, a polyester according to the present invention can be prepared by reaction of unsaturated polyester prepolymers comprised of the same components, while in other embodiments they can be prepared by reaction of two or more unsaturated polyester prepolymers that are formed by different components. That is, a first unsaturated polyester prepolymer is reacted by free radical polymerization with a second unsaturated polyester prepolymer; while each of the prepolymers have some degree of unsaturation, which may be the same or different, and which provide the primary vehicle through which the prepolymers polymerize to form a polyester, the components used to make the first and second prepolymers can be different, or can have one or more different components. In addition, the first and second copolymers can comprise the same components, but have different functionality, molecular weights, amounts of each component, and the like; this is sometimes referred to herein as different "proportions". Similarly, each of the first and second prepolymers can have the same or different types of terminal functionality. In this embodiment, the resulting polyester is likely to have random units derived from each type of prepolymer used. Thus, the present invention encompasses polyesters prepared by free radical polymerization of any number of different kinds of unsaturated polyester prepolymers as described herein. Polymerization of two or more different prepolymers can be performed using means standard in the art. Use of different prepolymers may result in polyesters having different properties. In this manner, polyesters can be formed that have desirable properties deriving from the use of the particular prepolymers used.

The polyesters prepared according to the present invention can have either branched or linear configuration. It will be appreciated by those skilled in the art that the polyester configuration will vary depending on the components used to form the prepolymer. For example, prepolymer components having trifunctionality or greater will typically result in a branched prepolymer, and therefore a branched polyester. Linear prepolymers are prepared from diols and diacids. After free radical reaction, the resulting polyester may contain a mixture of linear and branched structures. In certain embodiments when branched polyesters are produced, the branching is predominantly achieved through reaction of the unsaturation. It is possible to contribute a minor degree of branching in this embodiment through use of a tri- or tetra-ol, although the amount of such compound should be selected to avoid gellation. Other characteristics of the polyester will also vary depending on the make-up of the prepolymer.

In certain embodiments, the unsaturation can be random along the backbone of the polyester prepolymer. In certain other embodiments of the present invention, there is no double bond at the end of the prepolymer; that is, the polyester is "substantially free" of terminal unsaturation, such as less than 20%, such as less than 10% or less than 5%, less than 2% or less than 1% terminal unsaturation or completely free of terminal unsaturation. Jo certain embodiments, the polyester prepolymer is actually a monoester. Such a monoester may be formed if a monoalcohol is reacted with the polyacid or a monoacid is reacted with a polyol. Also, because of the variety typically associated with polymer formation, the reaction products that comprise the prepolymer will have a majority of configurations that are polyester, including diester, and will have some monoesters as well. Thus, the "poly" ester prepolymers of the present invention will most likely actually be a mix of esters largely comprising polyesters, but including monoesters as well.

As noted above, because the polyester according to the present invention is formed primarily through the free radical polymerization of the unsaturation in the unsaturated polyester prepolymer, the terminal and/or pendant functional group(s) will remain largely unreacted in the majority of the reaction products that comprise the polyester of the present invention. These unreacted functional groups can then be crosslinked with another component. Thus, the present invention is distinct from art in which gelled polyesters, that is extensively networked polyesters, are formed.

In certain embodiments it may be desirable to convert some or all of the hydroxy functionality on the unsaturated polyester prepolymer, such as before polymerization and/or on the branched polyester to another functionality. For example, the hydroxy can be reacted with a cyclic anhydride to result in acid functionality. Acid esters could also be formed.

In certain other embodiments, the unsaturated polyester prepolymer may comprise linkages in addition to the ester linkages. For example, the polyester prepolymer may further comprise one or more urethane linkages. Urethane linkages could be introduced by reacting an excess of the polyol prepolymer or the unsaturated polyester polymer with a polyisocyanate. The resulting product will still have terminal functionality and unsaturation, but will have urethane linkages in addition to ester linkages. Other chemistries could also be introduced. Accordingly, in certain embodiments, the unsaturated polyester prepolymer comprises one or more linkages in addition to ester linkages.

In certain embodiments, the unsaturated polyester prepolymers specifically exclude prepolymers that are formed by the reaction with aldehydes; thus, in this embodiment, acyl succinic acid polyesters are specifically excluded. Similarly, use of aldehyde in the solvent is specifically excluded in certain embodiments of the invention.

In certain other embodiments, the use of unsaturated monomers other than the unsaturated polyacid/anhydride/ester of the reaction product is excluded. For example, the use of vinyl monomers such as (meth)acrylates, styrene, vinyl halides and the like can be excluded in certain embodiments. It will be appreciated therefore that the present branched polyesters are not polyester/acrylic graft copolymers, which are widely known in the art.

The polyesters of the present invention formed primarily by free radical polymerization of unsaturated polyester prepolymers result in polyesters having both higher molecular weight and higher functionality (per molecule) as compared to conventional polyester resins. In certain embodiments, the increase in molecular weight of the polyesters of the present invention compared to the molecular weight of the unsaturated polyester prepolymers can be very significant, while in other embodiments it may only be incremental. Gel permeation chromatography results have confirmed that the molecular weight of different linear and slightly branched polyester prepolymers can be significantly increased by free radical polymerization to give higher molecular weight polyesters according to the present invention. Typically, the ratio of the weight average molecular weight ("Mw") of the polyester of the present invention to the Mw of the unsaturated polyester prepolymer is from 1.2 to 500, and in some cases can be greater than 500. The polyesters of the invention typically have a weight average molecular weight of from 600 to 10,000,000, such as 1,000 to 7,000,000, 10,000 to 4,000,000, 25,000 to 4,000, 000, 50,000 to 4,000,000, 100,000 to 4,000,000 or any combination within any of these ranges. In certain embodiments, the Mw of the polyester is greater than 1,000, such as greater than 5,000, greater than 10,000, greater than 25,000, or greater than 50,000, or greater than 100,000. The molecular weight increase can be controlled by one or more factors such as the type and/or amount of initiator used, the Fn of the unsaturated polyester prepolymer, the molecular weight and/or PDI of the unsaturated polyester prepolymer, the temperature and the type and/or amount of solvent.

In addition to the molecular weight described above, the polyesters of the present invention also have a higher functionality (per molecule) than would be expected for conventional polyesters having such molecular weights. The "average functionality" of the final polyester of this invention can be from 2.0 or greater, such as 2.5 or greater, 10 or greater, 50 or greater, or even higher. "Average functionality" as used in this context refers to the average number of functional groups on the final polyester. The functionality of the final polyester is measured by the number of "additional" functional groups that remain unreacted in the final polyester, and not by the unreacted unsaturation. It has been surprisingly discovered that, in certain embodiments, the concentration of functional groups as measured, for example, by the hydroxy value, the acid value and the like, of the final polyester prepolymer is similar to the concentration of functional groups of the polyester prepolymer. This indicates that the terminal and/or pendant functional groups on the prepolymer are not significantly involved in the polymerization reaction. Thus, in certain embodiments, the hydroxy value or acid value of the polyesters of the present invention can be in the same ranges as those given above for the prepolymer.

In certain embodiments the polyesters of the present invention will have both high functionality, such as a Mw of ≥15,000, such as 20,000 to 40,000, or higher than 40,000, and a functionality of ≥100 mg KOH/gm.

Because the polyester of the present invention comprises functionality, it is suitable for use in coating formulations in which the functional groups are crosslinked with other resins and/or crosslinkers typically used in coating formulations. Thus, the present invention is further directed to a coating formulation comprising a polyester according to the present invention and a crosslinker therefor. The crosslinker, or crosslinking resin or agent, can be any suitable crosslinker or crosslinking resin known in the art, and will be chosen to be reactive with the functional group or groups on the polyester. It will be appreciated that the coatings of the present invention cure through the reaction of the additional functionality and the crosslinker and not through the unsaturation, to the extent any exists, in the crosslinkable polyester.

Non-limiting examples of suitable crosslinkers include phenolic resins, amino resins, epoxy resins, isocyanate resins, blocked isocyanate resins, beta-hydroxy (alkyl) amide resins, alkylated carbamate resins, polyacids, anhydrides including polymeric anhydrides, organometallic acid-functional materials, polyamines, polyamides, aminoplasts, melamine formaldehyde condensates, urethane crosslinkers and mixtures thereof. In certain embodiments, the crosslinker is a phenolic resin comprising an alkylated phenol/formaldehyde resin with a functionality ≥3 and difunctional o-cresol/formaldehyde resins. Such crosslinkers are commercially available from Hexion as BAKELITE 6520LB and BAKELITE 7081LB.

Suitable isocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. patent application Ser. No. 12/056,304 filed Mar. 27, 2008, incorporated by reference in pertinent part herein. Suitable polyisocyanates are well known in the art and widely available commercially. For example, suitable polyisocyanates are disclosed in U.S. Pat. No. 6,316,119 at columns 6, lines 1.9-36, which excerpt is incorporated by reference herein. Examples of commercially available polyisocyanates include DESMODUR VP2078 and DESMODUR N3390, which are sold by Bayer Corporation, and TOLONATE HDT90, which is sold by Rhodia Inc.

Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, which excerpt is incorporated by reference herein.

In preparing the present coatings, the polyester and the crosslinker can be dissolved or dispersed in a single solvent or a mixture of solvents. Any solvent that will enable the formulation to be coated on a substrate may be used, and these will be well known to the person skilled in the art. Typical examples include water, organic solvent(s), and/or mixtures thereof. Suitable organic solvents include glycols, glycol ether alcohols, alcohols, ketones, acetates, mineral spirits, naphthas and/or mixtures thereof "Acetates" include the glycol ether acetates. In certain embodiments, the solvent is a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

In certain embodiments, the coatings of the present invention further comprise a curing catalyst. Any curing catalyst typically used to catalyze crosslinking reactions between polyester resins and crosslinkers, such as phenolic resins, may be used, and there are no particular limitations on the catalyst. Examples of such a curing catalyst include phosphoric acid, alkyl aryl sulphonic acid, dodecyl benzene sulphonic acid, dinonyl naphthalene sulphonic acid, and dinonyl naphthalene disulphonic acid. It will be appreciated that the coatings of the present invention principally cure by means of crosslinking between the functional groups on the polyester and the appropriate crosslinker or crosslinking resin, and not by reaction of any unsaturation that remains in the polyester.

If desired, the coating compositions can comprise other optional materials well known in the art of formulating coatings in any of the components, such as colorants, plasticizers, abrasion-resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, and other customary auxiliaries.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxaine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application Ser. No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating Example photosensitive compositions and/or photochromic compositions and methods for making them are identified in U.S. application Ser. No. 10/892,919 filed Jul. 16, 2004, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

It will be appreciated that the polyester of the present invention and crosslinker therefor can form all or part of the film-forming resin of the coating. In certain embodiments, one or more additional film-forming resins are also used in the coating. For example, the coating compositions can comprise any of a variety of thermoplastic and/or thermosetting coating compositions known in the art. The coating compositions may be water-based or solvent-based liquid compositions, or alternatively, may be in solid particulate form, i.e. a powder coating.

Thermosetting or curable coating compositions typically comprise film-forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, polyepoxy polymers, epoxy resins, vinyl resins, copolymers thereof, and mixtures thereof. Generally, these polymers can be any polymers of these types made by any method known to those skilled in the art. Such polymers may be solvent-borne or water-dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof. Appropriate mixtures of film-forming resins may also be used in the preparation of the present coating compositions.

Thermosetting coating compositions typically comprise a crosslinking agent that may be selected from any of the crosslinkers described above. In certain embodiments, the present coatings comprise a thermosetting film-forming polymer or resin and a crosslinking agent therefor and the crosslinker is either the same or different from the crosslinker that is used to crosslink the polyester. In certain other embodiments, a thermosetting film-forming polymer or resin having functional groups that are reactive with themselves are used; in this manner, such thermosetting coatings are self-crosslinking.

The coatings of the present invention may comprise 1 weight % to 100 weight %, such as 10 weight % to 90 weight % or 20 weight % to 80 weight %, with weight % based on total solid weight of the coating, of the polyester of the present invention. The coating compositions of the present invention may also comprise 0 weight % to 90 weight %, such as 5 weight % to 6) weight % or 10 weight % to 40 weight %, with weight % based on total solids weight of the coating, of a crosslinker for the polyester resin Additional components, if used, may comprise 1 weight % up to 70 weight %, or higher, with weight % based on total solids weight of the coating. Any numbers within any of these ranges are also within the scope of the present invention.

Coating formulations according to the present invention can have a significant increase in cure response and/or bending flexibility, and/or a noticeable improvement in mechanical deformation and/or sterilization resistance, as compared with conventional polyesters.

In certain embodiments of the present invention, the polyester and/or coating comprising the polyester are substantially epoxy-free. As used herein, the term "substantially epoxy-free" means that the polyester and/or coating comprising the same are substantially free from epoxy, epoxy residue, oxirane rings or residues of oxirane rings, bisphenol A, BADGE or adducts of BADGE, bisphenol F, BFDGE or adducts of BFDGE. In certain other embodiments of the present invention, the polyester and/or coating comprising the same are substantially free from bisphenol or residues thereof, including bisphenol A, bisphenol F BADGE and BFDGE. The polyester and/or the coatings comprising the same can also be substantially free of polyvinyl chloride or related halide-containing vinyl polymers "Substantially free" means that the polyester and/or coating comprise 10 weight % or less, such as 5 weight % or less, 2 weight % or less or 1 weight % or less of the compounds in any of the forms listed herein or otherwise known. Thus, it will be understood that polyesters and/or coatings according to the present invention can comprise trace or minor amounts of these components and still be "substantially free" of them. In yet other embodiments, the polyesters and/or coatings comprising the same are completely free of one or more of any of the compounds listed or referenced in this paragraph, or derivatives thereof.

The present coatings can be applied to any substrates known in the art, for example, automotive substrates, industrial substrates, packaging substrates, wood flooring and furniture, apparel, electronics including housings and circuit boards, glass and transparencies, sports equipment including golf balls, and the like. These substrates can be, for example, metallic or non-metallic. Metallic substrates include tin, steel, tin-plated steel, chromium passivated steel, galvanized steel, aluminum, aluminum foil, coiled steel or other coiled metal. Non-metallic substrates including polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather, both synthetic and natural, and the like. The substrate can be one that has been already treated in some manner, such as to impart visual and/or color effect.

The coatings of the present invention can be applied by any means standard in the art, such as electrocoating, spraying, electrostatic spraying, dipping, rolling, brushing, roller coating, flow coating, extrusion and the like.

The coatings can be applied to a dry film thickness of 0.04 mils to 4 mils, such as 0.1 to 2 or 0.7 to 1.3 mils. In other embodiments, the coatings can be applied to a dry film thickness of 0.1 mils or greater, 0.5 mils or greater, 1.0 mils or greater, 2.0 mils or greater, 5.0 mils or greater, or even thicker. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein.

It will be appreciated that the coatings described herein can be either one component ("1K"), or multi-component compositions such as two component ("2K") or more. A 1K composition will be understood as referring to a composition wherein all the coating components are maintained in the same container after manufacture, during storage, etc. A 1K coating can be applied to a substrate and cured by any conventional means, such as by heating, forced air, radiation cure and the like. The present coatings can also be multi-component coatings, which will be understood as coatings in which various components are maintained separately until just prior to application. As noted above, the present coatings can be thermoplastic or thermosetting.

In certain embodiments, the coating is a clearcoat. A clearcoat will be understood as a coating that is substantially transparent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be modified by reaction with carbamate.

In certain other embodiments, the coating is a basecoat. A basecoat is typically pigmented; that is, it will impart some sort of color and/or other visual effect to the substrate to which it is applied.

The coating compositions of the present invention can be applied alone or as part of a coating system that can be deposited onto the different substrates that are described herein. Such a coating system typically comprises a number of coating layers, such as two or more. A coating layer is typically formed when a coating composition that is deposited onto the substrate is substantially cured by methods known in the art (e.g., by thermal heating). The coating compositions described above can be used in one or more of the coating layers described herein.

In a conventional coating system used in the automotive industry, a pretreated substrate is coated with an electrodepositable coating composition. After the electrodepositable coating composition is cured, a primer-surfacer coating composition is applied onto a least a portion of the electrodepositable coating composition. The primer-surfacer coating composition is typically applied to the electrodepositable coating layer and cured prior to a subsequent coating composition being applied over the primer-surfacer coating composition. However, in some embodiments, the substrate is not coated with an electrodepositable coating composition. Accordingly, in these embodiments, the primer-surfacer coating composition is applied directly onto the substrate. In other embodiments, the primer-surfacer coating composition is not used in the coating system. Therefore, a color imparting basecoat coating composition can be applied directly onto the cured electrodepositable coating composition.

In certain embodiments, a clearcoat is deposited onto at least a portion of the basecoat coating layer. In certain embodiments, the substantially clear coating composition can comprise a colorant but not in an amount such as to render the clear coating composition opaque (not substantially transparent) after it has been cured. In certain instances, the BYK Haze value of the cured composition is less than 50, can be less than 35, and is often less than 20 as measured using a BYK Haze Gloss meter available from BYK Chemie USA.

The coating composition of the present invention can be used in either the basecoat and/or clearcoat described above.

In certain embodiments, the coatings of the present invention may be used in a monocoat coating system. In a monocoat coating system, a single coating layer is applied over a substrate (which can be pretreated or non-pretreated) that can comprise one or more of the following layers (as described above): an electrodepositable coating layer or a primer-surfacer coating layer. In certain embodiments, the coating composition of the present invention is used in a monocoat coating system.

The coatings of the present invention are particularly suitable for use as a packaging coating. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can than contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to cracking, popping, corrosion, blushing and/or blistering.

Accordingly, the present invention is further directed to a package coated at least in part with any of the coating compositions described above. A "package" is anything used to contain another item. It can be made of metal or non-metal, for example, plastic or laminate, and be in any form. In certain embodiments, the package is a laminate tube. In certain embodiments, the package is a metal can. The term "metal can" includes any type of metal can, container or any type of receptacle or portion thereof used to hold something. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends", which are typically stamped from can end stock and used in conjunction with the packaging of beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. In some embodiments, the coating is applied to a coil or sheet by roll coating; the coating is then cured by heating or radiation and can ends are stamped out and fabricated into the finished product, i.e. can ends. In other embodiments, the coating is applied as a rim coat to the bottom of the can; such application can be by roll coating. The rim coat functions to reduce friction for improved handling during the continued fabrication and/or processing of the can. In certain embodiments, the coating is applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

The packages of the present invention can be coated with any of the compositions described above by any means known in the art, such as spraying, roll coating, dipping, flow coating and the like; the coating may also be applied by electrocoating when the substrate is conductive. The appropriate means of application can be determined by one skilled in the art based upon the type of package being coated and the type of function for which the coating is being used. The coatings described above can be applied over the substrate as a single layer or as multiple layers with multiple heating stages between the application of each layer, if desired. After application to the substrate, the coating composition may be cured by any appropriate means.

As used herein, unless otherwise expressly specified, all numbers such s those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" polyester, "an" unsaturated polyester prepolymer, "a" terminal/pendant functional group, and "a" crosslinker, one or more of each of these and any other components can be used. As used herein, the term "polymer" refers to oligomers and both homopolymers and copolymers, and the prefix "poly" refers to two or more. Including and like terms means including, but not limited to. When ranges are given, any endpoints of those ranges and/or numbers within those ranges can be combined with the scope of the present invention.

EXAMPLES

The following examples are intended to illustrate the invention and should not be construed as limiting the invention in any way.

Example 1 Preparation of Unsaturated Polyester Prepolymers

Four different unsaturated polycondensation prepolymers according to the present invention were prepared. The reaction compositions used in preparing the unsaturated polyester prepolymers are as shown in Table 1 below. Dibutyl tin oxide was used to promote esterification and, in some prepolymers, a small amount of a free radical inhibitor, methylhydroquinone (MEHQ), was added to extend the usable shelf life of the unsaturated polyester prepolymers thus formed.

TABLE 1

| | Prepolymer | | | | | |
| --- | --- | --- | --- | --- | --- | --- |
| Monomers | Prepolymer A Wt Ratios | Prepolymer B Wt Ratios | Prepolymer C Wt Ratios | Prepolymer D Wt Ratios | Prepolymer E Wt Ratios | Prepolymer F Wt Ratios |
| MEG | — | — | — | 5.77 | 6.87 | 4.53 |
| 1,2 PD | 0.99 | 1.02 | 1.16 | — | — | — |
| 1,3 BD | 25.78 | 26.60 | 36.62 | 29.70 | 35.37 | 24.67 |
| TMP | 12.21 | 12.55 | 4.6 | — | — | 3.48 |

TABLE 1-continued

| | Prepolymer | | | | | |
|---|---|---|---|---|---|---|
| Monomers | Prepolymer A Wt Ratios | Prepolymer B Wt Ratios | Prepolymer C Wt Ratios | Prepolymer D Wt Ratios | Prepolymer E Wt Ratios | Prepolymer F Wt Ratios |
| TPA | 25.66 | 26.54 | 27.42 | — | — | — |
| IPA | 25.66 | 26.54 | 7.69 | 17.98 | 13.77 | 18.50 |
| CHDA | — | — | — | 43.53 | 33.28 | 44.80 |
| MAN | — | 6.74 | 22.52 | 3.02 | 10.71 | 4.02 |
| AA | 9.7 | — | — | — | — | — |
| DBTO | 0.024 | 0.025 | 0.025 | 0.2 | 0.1 | — |
| MEHQ | — | 0.02 | — | 0.009 | 0.032 | 0.012 |
| SnCl$_2$ | — | — | — | — | — | 0.15 |
| Let down solvent | butyl glycol | butyl glycol | butyl glycol | xylene | xylene | Butyl glycol/propylene glycol mono methyl ether 1/1 |
| Final resin solids | 74% | 74% | 74% | 70% | 70% | 71% |

In Table 1 above, MEG is monxethylene glycol; 1,2 PD is 1,2-propan diol; 1,3 BD is 1,3 butane diol; TMP is trimethylolpropane; TPA is terephthalic acid; IPA is isophthalic acid; CHDA is 1,4-cyclohexane dicarboxylic acid; MAN is maleic anhydride. AA is adipic acid; DBTO is dibutyl tin oxide; MEHQ is methyl hydroquinone; and SnCl$_2$ is stannous chloride.

The above prepolymers were prepared as described below:

Prepolymer A
A. Charge to reactor 1,3 BD, 1,2 PG, TMP, TPA, IPA & DBTO catalyst
B. Heat to a maximum temperature of 240° C. under nitrogen sparge and process to an acid value of less than 10 for resin clarity. Maintain max head temperature of packed column at 102° C. to minimize glycol losses.
C. Cool to 140° C. and sample for hydroxyl value. Adjust hydroxyl value to 178 net with 1,3 BD. Process in glycol adjustment at 180° C. for 2 hours.
D. Cool to 140° C. and charge AA Reheat to distillation with max reactor temperature of 170° C. for final acid value of 40-42.
E. Cool to 110° C. and charge thinning solvent butyl glycol.

Prepolymer B
A. Charge to reactor 1,3 BD, 1,2 PG, TMP, TPA, IPA & DBTO catalyst.
B. Heat to a maximum temperature of 240° C. under nitrogen sparge and process to an acid value of less than 10 for resin clarity. Maintain max head temperature of packed column at 102° C. to minimize glycol losses.
C. Cool to 140° C. and sample for hydroxyl value. Adjust hydroxyl value to 176 net with 1,3 BD. Process in glycol adjustment at 180° C. for 2 hours.
D. Cool to 140° C. and charge MAN. Reheat to distillation with max reactor temperature of 160° C. for final acid value of 40-42.
E. Cool to 110° C. and charge thinning solvent, butyl glycol, containing MEHQ inhibitor.

Prepolymer C
A. Charge to reactor 1,3 BD, 1,2 PG, TMP, TPA, IPA & DBTO catalyst.
B. Heat to a maximum temperature of 240° C. under nitrogen sparge and process to an acid value of less than 10 for resin clarity. Maintain max head temperature of packed column at 102° C. to minimize glycol losses.
C. Cool to 140° C. and charge MAN. Reheat to distillation with max reactor temperature of 200° C. for an acid value of 60-70.
D. Cool to 120° C. and sample for hydroxyl value. Adjust hydroxyl value to 40 net with 1,3 BD. Process in glycol adjustment at 120° C. for 2 hours.
E. Reheat to distillation with max reactor temperature of 200° C. for final acid value of 40-42.
F. Cool to 110° C. and charge thinning solvent butyl glycol.

Prepolymer D & E
A. Charge to reactor 1,3 BD, MEG, CHDA, IPA, MAN, MEHQ & DBTO in order.
B. Heat to a maximum temperature of 200° C. under nitrogen sparge and process to clarity (acid value approx 40-50).
C. Cool reactor to 180° C. and sample for hydroxyl value. Adjust hydroxyl value with 1,3 BD as required (Polymer D target OHV 40-42, Polymer E target OHV 150-153).
D. Reheat to 195-200° C. and establish azeotropic distillation with the careful addition of xylene.
E. Process to final acid value target of 1-3.
F. Cool to 135° C. and thin with xylene solvent.

Prepolymer F
A. Charge to reactor 1,3 BD, MEG, TMP, IPA, CHDA (43% of charge) & SnCl$_2$ catalyst.
B. Heat to a maximum temperature of 230° C. under nitrogen sparge and process to an acid value of less than 10 for resin clarity. Maintain max head temperature of packed column at 102° C. to minimize glycol losses.
C. Cool to 140° C. and charge MeHQ, CHDA (57% of charge), MAN. Reheat to distillation with max reactor temperature of 200° C. process to acid value of 70-80.
D. Cool to 120° C. and sample for hydroxyl value. Adjust hydroxyl value to −34.7 net with 1,3 BD. Process in glycol adjustment at 140° C. for 2 hours.
E. Reheat to distillation, 195-200° C. establish azeotropic distillation with the careful addition of xylene. Process to final acid value of 45-50.
F. Cool to 110° C. and charge thinning solvent butyl glycol and propylene glycol mono methyl ether.

TABLE 2

(Calculated parameters)

| Resin Code | Type | Gross OHV | AV | Mn | Maleic/Chain | Tg (° C.) |
|---|---|---|---|---|---|---|
| Prepolymer A | Branched | 118 | 42 | 1095 | — | 57.4 |
| Prepolymer B | Branched | 118 | 42 | 1109 | 0.86 | 70 |
| Prepolymer C | Branched | 82 | 42 | 1092 | 2.81 | 63.8 |
| Prepolymer D | Linear | 33 | 2 | 2500 | 0.9 | 66 |
| Prepolymer E | Linear | 150 | 2 | 726 | 0.9 | 60.5 |
| Prepolymer F | Branched | 15.3 | 50 | 2304 | 1.08 | 65 |

In Table 2 above, OHV is gross hydroxyl value (mg potassium hydroxide/g of prepolymer); AV is acid value (mg potassium hydroxide/g of prepolymer); Mn is number average molecular weight; maleic/chain is the average number of double bonds per unsaturated polyester prepolymer chain; and Tg is the glass transition temperature.

Acid value was determined as follows. The sample was dissolved in a suitable solvent(s). Standard solvents were DMF or a 3/1 mixture of xylene/methyl proxitol. Indicators used were thymol phthalein for DMF solvent & Phenol phthalein for xylene/methyl proxitol. The resin solution was titrated against 0.1N alcoholic KOH for end point.

Hydroxyl value was determined as follows. Resin samples were dissolved in a hydroxyl free solvent and an accurately known, but stoichmetric excess of acetic anhydride dissolved in butyl acetate was added. The solutions were then heated to allow the acetic anhydride to react with any hydroxyl groups in the resin. The remaining excess of acetic anhydride was then hydrolyzed using pyridine & water. Blank titrations were carried out with no resin sample. The blanks and resin solution samples were titrated against methanolic KOH to determine the net hydroxyl value.

Example 2 Preparation of Polyesters by Free Radical Polymerization of the Unsaturated Polyester Prepolymers Using the unsaturated polyester prepolymers of Example 1, polyesters were prepared by free radical polymerization of the chains of the unsaturated polyester prepolymers via their double bonds. Unless specified otherwise, the free radical polymerization step in the following examples was performed under stirring at 100° C., with a nitrogen purge, using tert-butyl-peroxy-2-ethylhexanoate as the free radical initiator which has a calculated half-life of 22.9 minutes at 100° C. Reaction mixture was held at temperature for 5 hours after initiator addition. Tests were conducted on the resulting polyesters and the tests and the results obtained are discussed below.

(a) Slightly Branched Polyester with a Calculated Maleic Functionality/Prepolymer Chain of <1

The free radical polymerization was conducted using two different approaches, the first involving the addition of a single shot of the free radical initiator and the second involving the addition of multiple shots of the initiator at intervals during the progress of the polymerization.

(i) Initiator Added as a Single Shot

A series of polyester resins was prepared by adding a 50% solution of initiator in butyl glycol to a 50% solution of the branched polyester Prepolymer B in butyl glycol at 0.1, 0.2, 0.3 and 0.9:1 molar ratios of initiator radical:maleic double bond ($R^*C=C$). The polyester resins produced as a result were coded Polyester 1, Polyester 2, Polyester 3 and Polyester 4 (which gelled) respectively.

During each resin preparation, samples were taken for gel permeation chromatography (GPC) analysis, both at 1 hour after the initiator addition and at the end of the process.

(ii) Multiple Shots of Initiator

Polyester 5 was prepared by adding a 50% solution of initiator in butyl glycol to a 50% solution of the branched Prepolymer B (see Tables 1 and 2 above) in butyl glycol at a total ratio of initiator:maleic double bond of 0.5:1 $R^*:C=C$ but, instead of adding all the initiator in one go, the initiator was divided into five equal amounts of 0.1:1 $R^*:C=C$, with a one hour interval between each initiator addition. Resin samples were taken 1 hour after each initiator addition for GPC analysis. These samples were labeled Polyester 5a, 5b, 5c, 5d and 5e respectively.

(iii) Control Polymers

Two control polymers were also prepared for GPC comparison:

Polyester 6: A 50% solution of Prepolymer B in butyl glycol was heated to 100° C. and held for three hours without initiator.

Polyester 7: A 50% solution in butyl glycol of Prepolymer A, a saturated polyester resin having a similar calculated number average molecular weight Mn, OHV and AV as Prepolymer B, was heated to 100° C. and a 50% butyl glycol solution of the equivalent amount of initiator (0.3:1) as in the preparation of Polyester 5c in Example 2(a)(ii) above was added in 3 separate shots at hourly intervals.

(b) Higher Maleic Functionality/Chain

To investigate the influence of higher maleic functionality per chain, Polyester 8 was prepared using the slightly branched polyester Prepolymer C at a 0.1:1 $R^*:C=C$ ratio under the same conditions used in Example 2(a), but with a process solids value of 60%. The polymer began to gel within 10 minutes after the initiator was added.

A second polymer Polyester 9 was prepared under the same conditions, but by adding a single shot of initiator at a significantly reduced $R^*:C=C$ ratio of 0.003:1 to the Prepolymer C; a sample was taken for GPC at 2 hours after the addition of initiator. Two further additions of initiator at intervals of 2 hours at a 0.006:1 $R^*:C=C$ ratio were made and samples taken 2 hours after each addition. The samples collected were labeled Polyester 9a, 9b and 9c respectively.

(c) Linear Polyesters with Different Starting Molecular Weights

To investigate the effect of the starting polyester chain length, the following resins were prepared, at 0.1:1 $R^*:C=C$ ratio using the same conditions as in Example 2(a) (i) and as solvent a mixture of xylene and butyl glycol, for GPC analysis:

Polyester 10—using Prepolymer D, calculated Mn 2500

Polyester 11—using Prepolymer E, calculated Mn 726

(d) Different Process Temperature and Different Types of Initiator

To verify that the free radical polymerization can be carried out at different process temperatures and with different types of initiators, the following resins were also prepared using Prepolymer D (see Tables 1 and 2 above) at 0.1:1 $R^*:C=C$ ratio and then analyzed by GPC:

Polyester 12: polymerization reaction at 100° C., initiator tert-butyl-peroxy-2-ethylhexanoate, calculated initiator half-life 22.9 minutes, total amount of initiator added in three equal portions at 2 hour intervals, sample taken 2 hours after final addition.

Polyester 13: polymerization reaction at 120° C., initiator tert-butyl-peroxy-2-ethylhexanoate, calculated initiator half-life 2.95 minutes, total amount of initiator added in three equal portions at 2 hour intervals, sample taken 2 hours after final addition.

Polyester 14: polymerization reaction at 80° C., initiator tert-butyl-peroxy-2-ethylhexanoate, calculated initiator half-life 223.6 minutes. Due to the much longer initiator half-life initiator added in one portion, after initiator addition the resin was held at 80° C. for 8 hours and sampled.

Polyester 15: polymerization reaction at 135° C., using tert-butyl peroxybenzoate as the initiator, calculated initiator half-life 13.0 minutes, total amount of initiator added in three equal portions at 2 hour intervals, sample taken 2 hours after final addition.

Polyester 16: polymerization reaction at 100° C., using dibenzoyl peroxide as the initiator, calculated initiator half-life 22.3 minutes, total amount of initiator added in three equal portions at 2 hour intervals, sample taken 2 hours after final addition.

(e) Polyester Prepared in an Aqueous Mixture

To verify that the free radical polymerization can be carried out in aqueous mixtures, the following resin was prepared using Prepolymer F (see Tables 1&2 above). Prepolymer F solution (43.2 gm) was mixed with dimethylaminoethanol (2.4 gm), then water (54.4 gm) was added and the resulting mixture used in the polymerization. Polymerization was carried out at 0.1:1 R*:C═C ratio with initiator tort-butyl-peroxy-2-ethylhexanoate, polymerization reaction at 90° C., calculated initiator half-life 69.4 minutes, total amount of initiator added in 1 hour feed, held at 90° C. for 2 hours after end of addition. Samples were taken at 15 minute intervals during the feed and then at 1 hour and 2 hours after the feed. Details of these samples, 17a, 17b, 17c, 17d, 17e and 17 f are given in Table 3 below and all show evidence of increase in molecular weight from the starting prepolymer.

The weight average molecular weights Mw were determined by GPC (referenced to polystyrene) for the polymers prepared in Examples 2(a) to 2(d) above. The Mw increase factor compared to the respective starting prepolymers was calculated. These results are tabulated in Table 3 below.

TABLE 3

| Resins | Total R*: C═C | Comments on samples | Mw | n × Mw increase |
|---|---|---|---|---|
| Prepolymer B | — | Starting PE | 2684 | — |
| Polyester 1 | 0.1 | Single addition | 3761 | 1.4 |
| Polyester 2 | 0.2 | Single addition | 5616 | 2.09 |
| Polyester 3 | 0.3 | Single addition | 11,180 | 4.17 |
| Polyester 5a | 0.1 | $1^{st}$ shot | 3,359 | 1.25 |
| Polyester 5b | 0.2 | $2^{nd}$ shot | 5,019 | 1.87 |
| Polyester 5c | 0.3 | $3^{rd}$ shot | 9,680 | 3.61 |
| Polyester 5d | 0.4 | $4^{th}$ shot | 35,140 | 13.09 |
| Polyester 5e | 0.5 | $5^{th}$ shot | 239,600 | 89.27 |
| Prepolymer C | — | Starting PE | 8,545 | — |
| Polyester 9a | 0.003 | $1^{st}$ shot | 19,690 | 2.3 |
| Polyester 9b | 0.009 | $2^{nd}$ shot | 72,490 | 8.48 |
| Polyester 9c | 0.015 | $3^{rd}$ shot | 3,403,000 | 398.24 |
| Prepolymer D | — | Starting PE | 3,322 | — |
| Polyester 10 | 0.1 | Single addition | 11,220 | 3.38 |
| Prepolymer E | — | Starting PE | 928 | — |
| Polyester 11 | 0.1 | Single addition | 3,590 | 3.87 |
| Prepolymer B | — | Starting PE | 2,684 | — |
| Polyester 6 | 0 | No initiator | 2,691 | No change |
| Prepolymer A | — | Starting PE | 3,118 | — |
| Polyester 7 | 0.3 | No maleic | 3,118 | No change |
| Prepolymer D'(note 1) | — | Starting PE | 2,380 | — |
| Polyester 13 | 0.1 | 120° C. | 4,999 | 2.10 |
| Polyester 12 | 0.1 | 100° C. | 4,762 | 2.00 |
| Polyester 14 | 0.1 | 80° C. | 3,588 | 1.51 |
| Polyester 15 | 0.1 | 135° C. | 8,572 | 3.60 |

TABLE 3-continued

| Resins | Total R*: C═C | Comments on samples | Mw | n × Mw increase |
|---|---|---|---|---|
| Polyester 16 | 0.1 | 100° C. | 6,001 | 2.52 |
| Prepolymer F | — | Starting PE | 12900 | — |
| Polyester 17a | 0.025 | 15 mins feed | 13870 | 1.08 |
| Polyester 17b | 0.05 | 30 mins feed | 22050 | 1.71 |
| Polyester 17c | 0.075 | 45 mins feed | 38280 | 2.97 |
| Polyester 17d | 0.1 | At end feed | 76750 | 5.95 |
| Polyester 17e | 0.1 | 1 hour hold | 218500 | 16.94 |
| Polyester 17f | 0.1 | 2 hour hold | 195200 | 15.13 |

Note
₁Prepolymer D' is second batch of Prepolymer D

As confirmation that the free radical polymerization process did not affect the other functional groups, hydroxy and carboxy, the hydroxyl and acid values of Polyester 12 (0.1:1 R*:C═C) were compared against the starting unsaturated polyester Prepolymer D'. The results, given in mg KOH/g of resin, are as follows:

| | Net OHV | AV | Gross OHV |
|---|---|---|---|
| Prepolymer D' | 40.2 | 2.1 | 42.3 |
| Polyester 12 | 40.0 | 2.5 | 42.5 |

The results show that there was no reduction in hydroxyl value after free radical polymerization, but there was a slight increase in acid value. However, gas chromatography of polyester polymerized with higher levels of tert-butyl peroxy-2-ethylhexanoate had shown the presence oft-butanol and 2-ethyl hexanoic acid in the final polymer. The slight increase in acid value of Polyester 12 is more likely to be due to the formation of 2-ethyl hexanoic acid from the tert-butyl peroxy-2-ethylhexanoate during the process rather than a change in carboxyl groups on the prepolymer.

The GPC results set out in Table 3 above confirm that the addition of free radical initiators to unsaturated polyester prepolymers according to the present invention results in the preparation of polyesters having a significant increase in weight average molecular weight Mw compared to the starting prepolymer. In conjunction with the fact demonstrated above, that other functional groups on the prepolymer remain relatively unaffected, free radical polymerization of unsaturated polyester prepolymers as described in this invention will enable polyesters with a combination of average functionality and molecular weight to be achieved that has not been previously attainable by other conventional methods. The starting prepolymer can be linear, branched, have different starting molecular weight (chain length) and have different numbers of double bonds per chain, to give different resulting polyesters according to the present invention and m all cases an increased molecular weight is observed. Also the weight average molecular weight Mw increase can be achieved using different types of fire radical initiators and at different temperatures.

There were no changes in the weight average molecular weight Mw of the two control resins, Polyester 6 (without initiator) and Polyester 7 (without double bonds in the starting polyester prepolymer), which indicates that the polymerization is specific to the unsaturated groups in the starting polyester prepolymer in the presence of a free radical initiator and not a face of the process conditions.

The weight average molecular weight Mw increased with increasing levels of initiator, irrespective of whether the initiator was added in a single addition or added in multiple shots. However, excessively high initiator levels can lead to resin gellation, as demonstrated in Polyester 4 (0.9:1 R*:C=C ratio). Also, the higher average number of 2.81 double bonds per chain Prepolymer C needed significantly less initiator to reach a weight average molecular weight Mw almost to the point of gellation (see Polyester 9). This suggests that the weight average molecular weight Mw increase can also be influenced by the average number of double bonds per prepolymer chain.

Example 3 Testing of Resins for Packaging Coatings

Some of the free radical polymerized polyesters prepared in Examples 2(a) to 2(d) above, together with the respective starting polyester prepolymers, were reacted with BAKELITE 6520LB, an alkylated phenol/formaldehyde resin (functionality ≥3) and BAKELITE 7081LB, an unalkylated o-cresol/formaldehyde resin (difunctional), at different levels of the phenolic resins and with different levels of phosphoric acid catalyst to give a range of coating formulations according to the present invention. The amounts of resin and phosphoric acid catalyst used and the solvent employed are given in the results reported below.

The coating formulations thus prepared were applied by a wire bar coater onto 0.22 mm tinplate panels and cured in a laboratory box oven. The chosen cure time and temperature ranges were from 4 to 12 minutes and 160 to 200° C. respectively, with a center point of 8 minutes and 180° C.

The cured panels of the different samples were subjected to the following tests commonly used to assess packaging coatings:

Methylethyl ketone (MEK) rubs—for cure and chemical resistance comparison.

Wedge Bends—to check bending flexibility, film integrity & film network.

Box Draw—to compare mechanical deformation.

Sterilization—(90 min at 121° C. in water & steam).

MEK rubs: a panel of the cured film is rubbed back and forth in a linear direction (counted as 1 double rub) using a piece of cotton wool soaked in MEK until the coating has been removed or readied 200 double rubs. The number of double rubs is recorded.

Wedge Bend: a 10 cm long×4 cm wide strip of coated panel is formed into a U-shape on a 6 mm metal bar, the U-shaped piece is then placed into a tapered recess and a 2 kg metal weight is dropped onto the test piece from a height of 60 cm to form a wedge shape. After immersion in an acidified copper sulphate solution for 2 minutes, the test piece is rinsed in tap water and visually assessed for any cracking. The length of film along the bend without cracking is recorded as a percentage of the total length of the test piece.

Box draw: a coated panel is placed in a stamping press to produce a small square box (21 mm in depth). The corners of the box is visually assess for any coating breakdown. The result is recorded as an average of the depth of draw without breakdown.

Sterilization: a coated panel is placed in a lidded container part filled with tap water with half of the panel immersed and half of the panel above the water line. The container is then placed inside an autoclave and heated to the described temperature and duration. The coating is assessed for any film defects and graded from 0-10 (0=no defects, 10=severe coating breakdown).

To assess the potential use of the free radical polymerized resin formulations in water-based coatings, Polyester 2, Polyester 3 and the starting Prepolymer B were neutralized with different amounts of dimethylethanolamine and diluted with deionized water.

Packaging Coatings Test Results

Tests were performed on the following three resins: Prepolymer B (starting polyester prepolymer), Polyester 2 (0.2:1 R*:C=C) and Polyester 5 (0.5:1 R*:C=C) (see Tables 1 to 3 above) to measure the performance of polyesters of the present invention obtained by the free radical polymerization of the starting polyester prepolymer as measured against said starting polyester prepolymer. The tests conducted involved crosslinking of the polyesters with two alternative phenolic resins, coating of the resulting formulations on a test substrate, curing of the coating formulations and then comparing performance of the coatings using standard industry techniques.

(a) Response to Catalysis

Catalyst used: Phosphoric acid—in millimoles per 100 g resin solids (mmol phr)

Cure conditions: 8 minutes at 180° C.

Substrate: 0.22 mm 2.8/2.8 tin-plated steel

Film weight: 5-6 grams/m$^2$ (gsm)

Phenolic resins: BAKELITE 6520LB (functionality ≥3)
    BAKELITE 7081LB (functionality=2)

Phenolic level: 6520LB 25.5% of total binder solids
    78081LB 19.3% of total binder solids Tests: MEK double rubs—number of rubs before film removal.

Wedge Bend—% of the coating without any fracture.

The results are as shown in Table 4 & 5.

TABLE 4

| With BAKELITE 6520LB | | Catalyst mmol phr | MEK double rubs | Wedge Bend |
|---|---|---|---|---|
| Prepolymer B | Sample B-1 | 0 | 10 | 44% |
|  | Sample B-2 | 1 | 6 | 26% |
|  | Sample B-3 | 5 | 20 | 76% |
|  | Sample B-4 | 10 | 20 | 72% |
| Polyester 2 | Sample 2-1 | 0 | 14 | 72% |
|  | Sample 2-2 | 1 | 23 | 75% |
|  | Sample 2-3 | 5 | 118 | 83% |
|  | Sample 2-4 | 10 | 200 | 73% |
| Polyester 5 | Sample 5-1 | 0 | 45 | 74% |
|  | Sample 5-2 | 1 | 75 | 85% |
|  | Sample 5-3 | 5 | 200 | 84% |
|  | Sample 5-4 | 10 | 200 | 89% |

TABLE 5

| With BAKELITE 7081LB | | Catalyst mmol phr | MEK double rubs | Wedge Bend |
|---|---|---|---|---|
| Prepolymer B | Sample B-5 | 0 | 1 | 0% |
|  | Sample B-6 | 1 | 1 | 0% |
|  | Sample B-7 | 5 | 5 | 66% |
|  | Sample B-8 | 10 | 5 | 0% |
| Polyester 2 | Sample 2-5 | 0 | 1 | 0% |
|  | Sample 2-6 | 1 | 2 | 0% |
|  | Sample 2-7 | 5 | 18 | 78% |
|  | Sample 2-8 | 10 | 10 | 9% |
| Polyester 5 | Sample 5-5 | 0 | 5 | 0% |
|  | Sample 5-6 | 1 | 40 | 69% |
|  | Sample 5-7 | 5 | 40 | 88% |
|  | Sample 5-8 | 10 | 60 | 86% |

Further tests were also conducted using differing amount of phenolic resin.

Catalyst used: 5 mmol phr Phosphoric acid

Cure, condition: 8 minutes at 180° C.

Substrate: 0.22 mm 2.8/2.8 tin plated steel
Film weight: 5-6 gsm
Phenolic resins: BAKELITE 6520LB (functionality ≥3)
  BAKELITE 7081LB (functionality=2)
Tests: MEK double rubs—number of rubs before film removal.
  Wedge Bend—% of the coating without any fracture.
  Box Draw—mm passed (maximum draw 21 mm)
The results are shown in Table 6 and 7.

TABLE 6

| With 5 mmol catalyst phr | | 6520LB % on solids | MEK double rubs | Wedge Bend | Box Draw (mm) |
|---|---|---|---|---|---|
| Prepolymer B | Sample B-9 | 0 | 1 | 0% | 5.8 |
| | Sample B-10 | 14.6 | 14 | 81% | 7.3 |
| | Sample B-11 | 25.5 | 20 | 76% | 4.5 |
| | Sample B-12 | 40.6 | 200 | 75% | 2.8 |
| | Sample B-13 | 50.6 | 200 | 64% | 2 |
| Polyester 2 | Sample 2-9 | 0 | 1 | 0% | 5.9 |
| | Sample 2-10 | 14.6 | 56 | 77% | 7.6 |
| | Sample 2-11 | 25.5 | 118 | 83% | 4.9 |
| | Sample 2-12 | 40.6 | 200 | 72% | 2.5 |
| | Sample 2-13 | 50.6 | 200 | 62% | 1.4 |
| Polyester 5 | Sample 5-9 | 0 | 3 | 0% | 11.0 |
| | Sample 5-10 | 14.6 | 200 | 90% | 8.0 |
| | Sample 5-11 | 25.5 | 200 | 94% | 5.0 |
| | Sample 5-12 | 40.6 | 200 | 77% | 3.0 |
| | Sample 5-13 | 50.6 | 200 | 68% | 3.0 |

TABLE 7

| With 5 mmol catalyst phr | | 7081LB % on solids | MEK double rubs | Wedge Bend | Box Draw (mm) |
|---|---|---|---|---|---|
| Prepolymer B | Sample B-14 | 0 | 1 | 0% | 5.8 |
| | Sample B-15 | 10.7 | 1 | 0% | 8 |
| | Sample B-16 | 19.3 | 5 | 66% | 6.3 |
| | Sample B-17 | 32.4 | 20 | 73% | 8.5 |
| | Sample B-18 | 41.8 | 15 | 58% | 8.3 |
| Polyester 2 | Sample 2-14 | 0 | 1 | 0% | 5.9 |
| | Sample 2-15 | 10.7 | 2 | 1% | 6.1 |
| | Sample 2-16 | 19.3 | 18 | 78% | 5.8 |
| | Sample 2-17 | 32.4 | 24 | 76% | 7.5 |
| | Sample 2-18 | 41.8 | 36 | 63% | 8.1 |
| Polyester 5 | Sample 5-14 | 0 | 3 | 0% | 11.0 |
| | Sample 5-15 | 10.7 | 50 | 81% | 10.0 |
| | Sample 5-16 | 19.3 | 40 | 88% | 9.0 |
| | Sample 5-17 | 32.4 | 63 | 79% | 9.0 |
| | Sample 5-18 | 41.8 | 95 | 68% | 8.0 |

It is clear from the MEK rub and Wedge Bend test results as shown in Tables 4 and 5 that cure and bending flexibility, which is indicative of the extent of the film network, significantly improves as the molecular weight and the functionality/chain of the resin increases.

For the coatings obtained from the highest molecular weight Polyester 5 with the poly-functional phenolic, due to the increase in functionality/chain in the enhanced molecular weight polyesters of the present invention, a lower level of phenolic crosslinker is needed to achieve the improvement in film network (see Table 6).

The Box Draw flexibility of the coating obtained with the difunctional phenolic crosslinker and the same polyester is also noticeably better than that obtained with the difunctional phenolic and the lower molecular weight polyester Prepolymer 2 (see Table 7).

(b) Sterilization Resistance (90 Minutes/121° C. in Tap Water)
Catalyst used: 5 mmol phr Phosphoric acid
Cure condition: 4-12 minutes at 160-200° C.
Substrate: 0.22 mm 2.8/2.8 tin plated steel
Phenolic resins: BAKELITE 6520LB (functionality ≥3)
  BAKELITE 7081LB (functionality=2)

The samples that gave the highest Wedge Bend results from each polyester resin above were coated and cured for different times and at different temperatures. The coated panels were placed in a Kilner jar, with the lower half of the panel immersed in tap water and the upper half of the panel above the water-line, and sterilized in an autoclave.
Tests: 90 minutes at 121° C. in tap water
  Visual inspection of panel exposed to vapor and immersed
  0=no defects, 10=Complete film breakdown
Tested Resins:
Prepolymer B: With 14.6% 6520LB (Sample B-10)
  With 32.4% 7081LB (Sample B-17)
Polyester 2: With 25.5% 6520LB (Sample 2-11)
  With 19.3% 7081LB (Sample 2-16)
Polyester 5: With 25.5% 6520LB (Sample 5-11)
  With 19.3% 7081LB (Sample 5-16)
The results are shown in Tables 8 and 9

TABLE 8

| With BAKELITE 6520LB | | Coating cure conditions | Water sterilization (90 min./121° C.) | |
|---|---|---|---|---|
| | | | Vapor | Immersed |
| Prepolymer B | Sample B-10 | 4 min./160° C. | 9 | 9 |
| | | 12 min./160° C. | 3 | 2 |
| | | 8 min./180° C. | 3 | 3 |
| | | 4 min./200° C. | 3 | 0 |
| | | 12 min./200° C. | 3 | 3 |
| Polyester 2 | Sample 2-11 | 4 min./160° C. | 3 | 3 |
| | | 12 min./160° C. | 2 | 3 |
| | | 8 min./180° C. | 3 | 0 |
| | | 4 min./200° C. | 3 | 3 |
| | | 12 min./200° C. | 3 | 0 |
| Polyester 5 | Sample 5-11 | 4 min./160° C. | 9 | 2 |
| | | 12 min./160° C. | 2.5 | 2.5 |
| | | 8 min./180° C. | 2.5 | 0 |
| | | 4 min./200° C. | 2 | 0 |
| | | 12 min./200° C. | 0 | 0 |

TABLE 9

| With BAKELITE 7081LB | | Coating cure conditions | Water sterilization (90 min./121° C.) | |
|---|---|---|---|---|
| | | | Vapor | Immersed |
| Prepolymer B | Sample B-17 | 4 min./160° C. | 8.75 | 9 |
| | | 12 min./160° C. | 3 | 3 |
| | | 8 min./180° C. | 2 | 3 |
| | | 4 min./200° C. | 3 | 3 |
| | | 12 min./200° C. | 2 | 0 |
| Polyester 2 | Sample 2-16 | 4 min./160° C. | 5 | 9.25 |
| | | 12 min./160° C. | 3 | 3 |
| | | 8 min./180° C. | 2 | 0 |
| | | 4 min./200° C. | 3 | 3 |
| | | 12 min./200° C. | 3 | 3 |
| Polyester 5 | Sample 5-16 | 4 min./160° C. | 2 | 0 |
| | | 12 min./160° C. | 2 | 2 |
| | | 8 min./180° C. | 2 | 0 |
| | | 4 min./200° C. | 3 | 0 |
| | | 12 min./200° C. | 2 | 2 |

The highest molecular weight and functionality/chain resin Polyester 5 gave a noticeable improvement in performance in the immersed phase. Curing at 12 minutes/200° C. with the poly-functional phenolic actually passed the sterilization test whereas the lower molecular weight resin formed with the polyester prepolymer either failed in the steam phase or the immersed phase.

(c) Conversion to a Water-Based Polyester

Prepolymer B, Polyester 2 and Polyester 5 all have a calculated AV of 42. The starting Prepolymer B needed 70% neutralization with dimethylethanolamine to produce a clear solution in deionized water. The high molecular weight polyesters of the invention, Polyester 2 and Polyester 5, however, only required 50% neutralization to achieve a clear solution when diluted with the same amount of deionized water. This further confirms that the number of acid groups/chain has been increased as a result of the radical polymerization.

Whereas particular embodiments of this invention have been described above for purposes of illustration, it will be evident to those skilled in the art that numerous variations of the details of the present invention may be made without departing from the invention as defined in the appended claims.

The invention claimed is:

1. A process for preparing an ungelled crosslinkable polyester resin comprising:
   (a) reacting a polycarboxylic acid with a polyol to form an unsaturated polyester prepolymer in which the unsaturation is along the backbone of the unsaturated polyester prepolymer and wherein the unsaturated polyester prepolymer has terminal acid and/or hydroxyl functional groups, a hydroxyl value ranging from 2 to 500 mg KOH/gm and/or an acid value ranging from 1 to 400 mg KOH/gm; and
   (b) subjecting the unsaturated polyester prepolymer to thermally induced free radical polymerization via the points of unsaturation along the unsaturated polyester prepolymer backbone to form the ungelled crosslinkable polyester resin that has a higher weight average molecular weight than the unsaturated polyester prepolymer such that the weight average molecular weight ratio of the ungelled crosslinkable polyester resin to the unsaturated polyester prepolymer is at least 1.2 and the hydroxyl value and the acid value of the ungelled crosslinkable polyester resin is in the same range as those of the prepolymer.

2. The process of claim 1 in which the unsaturated polyester prepolymer comprises one or more unsaturated polyester prepolymers.

3. The process of claim 2 in which the unsaturated polyester prepolymer comprises a mixture of different unsaturated polyester prepolymers.

4. The process of claim 1 in which the polycarboxylic acid is unsaturated.

5. The process of claim 4 in which the polycarboxylic acid comprises maleic, fumaric and/or itaconic acid and/or the esters and/or the anhydrides thereof.

6. The process of claim 1 wherein the number average functionality of unsaturation is from 0.1 to 5.0.

7. The process of claim 1 wherein the thermally induced free radical polymerization conditions are by heating the unsaturated polyester prepolymer in a diluent comprising an organic solvent and/or water to a temperature of 50 to 150° C. in the presence of a free radical initiator.

8. The process of claim 1 in which the unsaturated polyester prepolymer component has a number average molecular weight of 150 to 5000.

9. The process of claim 1 in which the ungelled crosslinkable polyester resin has a weight average molecular weight of at least 15,000 and a functionality of at least 100 mg KOH/gm.

10. The process of claim 1 in which the ungelled crosslinkable polyester resin has a weight average molecular weight of 1000-7,000,000.

* * * * *